(12) United States Patent
Lee et al.

(10) Patent No.: US 9,342,538 B2
(45) Date of Patent: May 17, 2016

(54) ELECTRONIC DEVICE AND DATABASE ACCESSING METHOD

(71) Applicant: Zijilai Innovative Services Co., Ltd., Shenzhen (CN)

(72) Inventors: Chung-I Lee, New Taipei (TW); De-Yi Xie, Shenzhen (CN); Jie Huang, Shenzhen (CN)

(73) Assignee: Zijilai Innovative Services Co., Ltd., Shenzhen (CN)

( * ) Notice: Subject to any disclaimer, the term of this patent is extended or adjusted under 35 U.S.C. 154(b) by 237 days.

(21) Appl. No.: 14/159,394

(22) Filed: Jan. 20, 2014

(65) Prior Publication Data

US 2014/0214866 A1 Jul. 31, 2014

(30) Foreign Application Priority Data

Jan. 29, 2013 (CN) .......................... 2013 1 00327589

(51) Int. Cl.
*G06F 17/30* (2006.01)
*G06F 7/00* (2006.01)

(52) U.S. Cl.
CPC .... *G06F 17/30289* (2013.01); *G06F 17/30256* (2013.01); *G06F 17/30424* (2013.01); *G06F 17/30507* (2013.01); *G06F 17/30864* (2013.01)

(58) Field of Classification Search
CPC .................. G06F 17/30864; G06F 17/30424; G06F 17/30256; G06F 17/30289; G06F 17/30507; G06F 17/3056; G06F 17/30604
See application file for complete search history.

(56) References Cited

U.S. PATENT DOCUMENTS

| | | | | |
|---|---|---|---|---|
| 8,010,581 B2* | 8/2011 | Bechtel | ............. | G06F 17/30286 707/805 |
| 8,356,036 B2* | 1/2013 | Bechtel | ................. | G06F 19/324 707/748 |
| 2003/0149934 A1* | 8/2003 | Worden | .............. | G06F 17/3056 715/239 |
| 2008/0027788 A1* | 1/2008 | Lawrence | .............. | G06Q 30/02 705/7.33 |
| 2010/0312592 A1* | 12/2010 | Sallakonda | ............ | G06Q 10/10 705/7.37 |
| 2011/0082843 A1* | 4/2011 | Kashiwagi | ........ | G06F 17/30289 707/693 |
| 2011/0087697 A1* | 4/2011 | Kashiwagi | ........ | G06F 17/30321 707/769 |
| 2011/0258232 A1* | 10/2011 | Scriffignano | ..... | G06F 17/30448 707/780 |

* cited by examiner

*Primary Examiner* — Dung K Chau
(74) *Attorney, Agent, or Firm* — Novak Druce Connolly Bove + Quigg LLP

(57) ABSTRACT

In a database accessing method using an electronic device having a database, character fields and corresponding attributes are predefined. An entity object including the character fields is generated and provided to a client device for inputting business data. After receiving an encapsulated entity object from the client device, the business data including selected character fields, corresponding character data, and an operation request for the database are acquired. When the database includes a data table and the data table includes the character fields corresponding to the selected character fields, the selected character fields and the character data of the selected character fields are verified. When the selected character fields and the character data of the selected character fields are valid, character data of the character fields corresponding to the selected character fields are updated using the character data of the selected character fields according to the operation request.

20 Claims, 4 Drawing Sheets

ELECTRONIC DEVICE AND DATABASE ACCESSING METHOD

FIELD

Embodiments of the present disclosure relate to database management technology, and particularly to an electronic device and a database accessing method using the electronic device.

BACKGROUND

Operations on databases are important during the development of application programs. It is time-consuming to write scripts for managing data stored in the database. Although some database management tools can help developers to manage a database, the database management tools may lack a maintenance function and expandability.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

All of the processes described below can be embodied in, and fully automated via, functional code modules executed by one or more general purpose electronic devices or processors. The code modules can be stored in any type of non-transitory computer-readable medium or other storage device. Some or all of the methods can alternatively be embodied in specialized hardware. Depending on the embodiment, the non-transitory computer-readable medium can be a hard disk drive, a compact disc, a digital video disc, a tape drive or other suitable storage medium.

Figure 1:
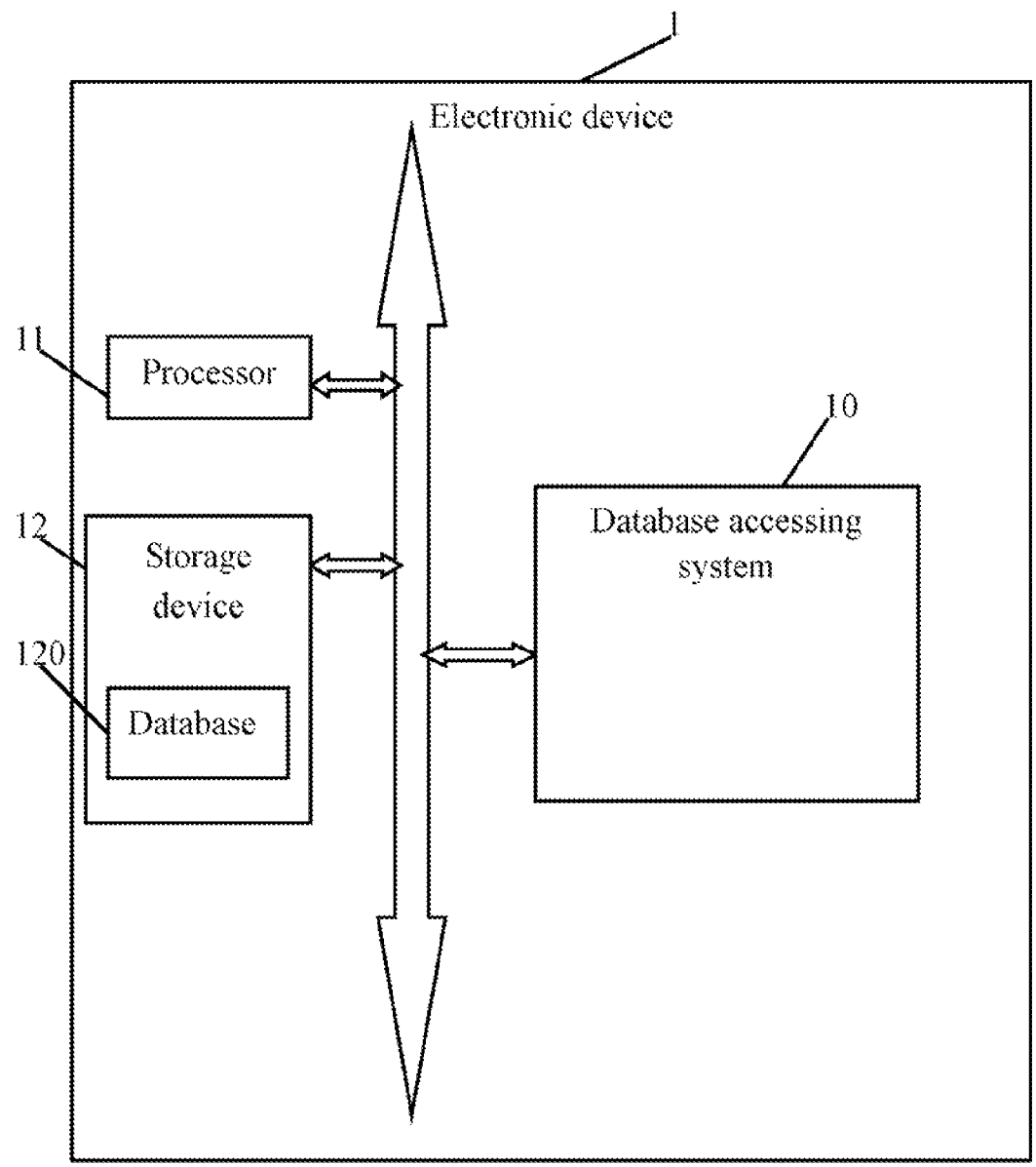
FIG. 1 is a block diagram of one embodiment of an electronic device including a database accessing system.

FIG. 1 is a block diagram of one embodiment of an electronic device 1 including a database accessing system 10. In some embodiments, the electronic device 1 can be a notebook computer, a tablet computer, a server, a communication device, a personal digital assistant, or any computing device. The electronic device 1 further includes at least one processor 11 and a storage device 12. FIG. 1 illustrates only one example of an electronic device 1, such electronic device can include more or fewer components than illustrated, or have a different configuration of the various components.

The at least one processor 11 is used to execute the database accessing system 10 and other applications installed in the electronic device 1, such as an operating system of the electronic device 1. The storage device 12 stores one or more programs, such as the operating system and applications of the electronic device 1. In some embodiments, the storage device 12 can be a hard disk, or an external storage card, such as a memory stick, a smart media card, a compact flash card, a secure digital card, or other type of memory storage device.

The storage device 12 includes one or more databases 120 (only one is shown in FIG. 1) for storing different kinds of data. In other embodiments, the database 120 can be located in an external device, which is connected to the electronic device 1.

The database accessing system 10 can generate object-oriented entities, and access and manage data tables in the database 120 according to predefined character fields. Operations of accessing and managing the database can include, but are not limited to, creating new data tables, and creating, inserting, deleting, and/or updating character fields in the data tables.

Figure 2:
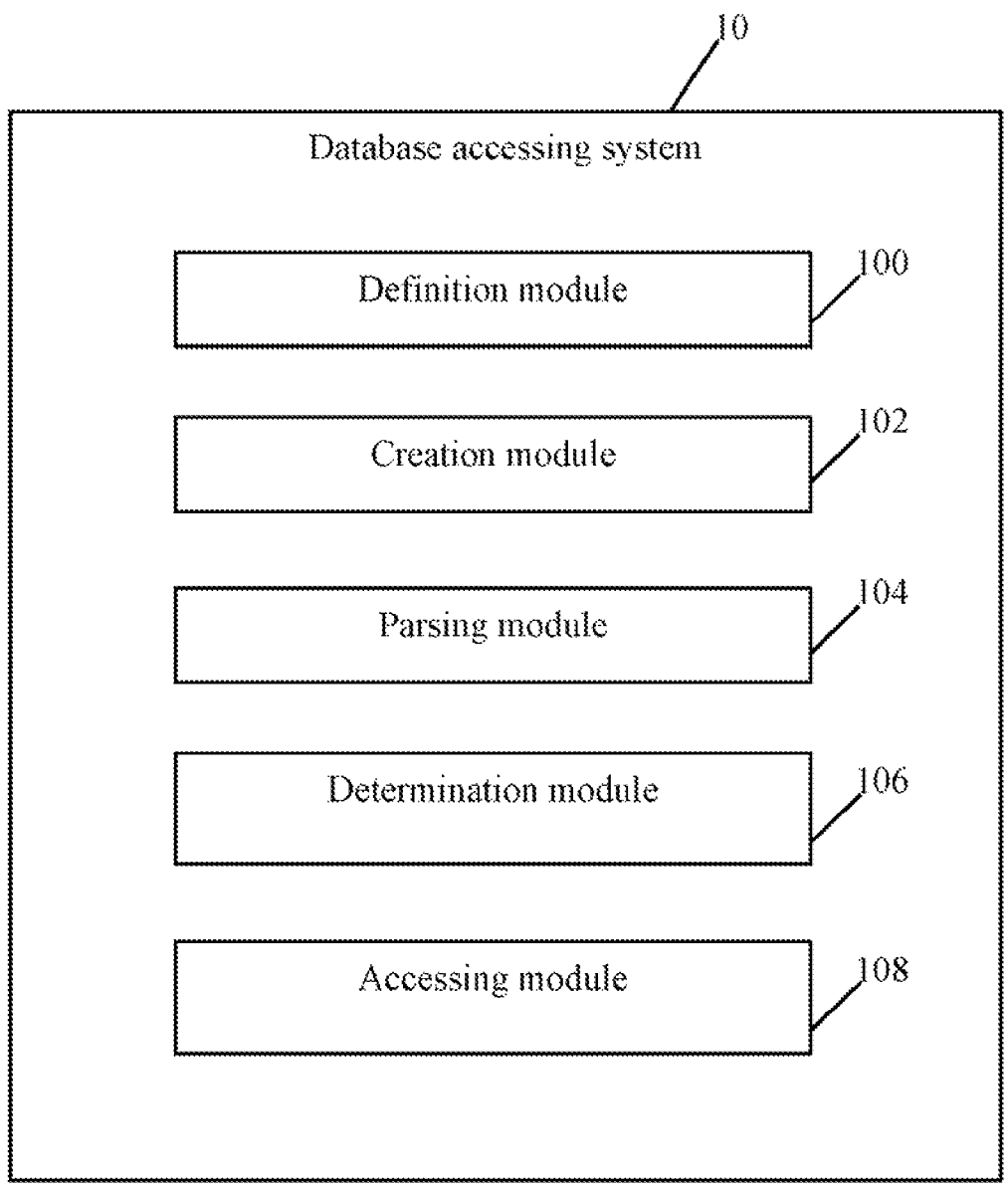
FIG. 2 is a block diagram of one embodiment of function modules of the database accessing system.

FIG. 2 is a block diagram of one embodiment of function modules of the database accessing system 10. The database accessing system 10 can include computerized instructions in the form of one or more programs that are executed by the at least one processor 11 and stored in the storage device 12. In one embodiment, the database accessing system 10 can include one or more modules, for example, a definition module 100, a creation module 102, a parsing module 104, a determination module 106, and an accessing module 108. In general, the word "module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

Figure 3:
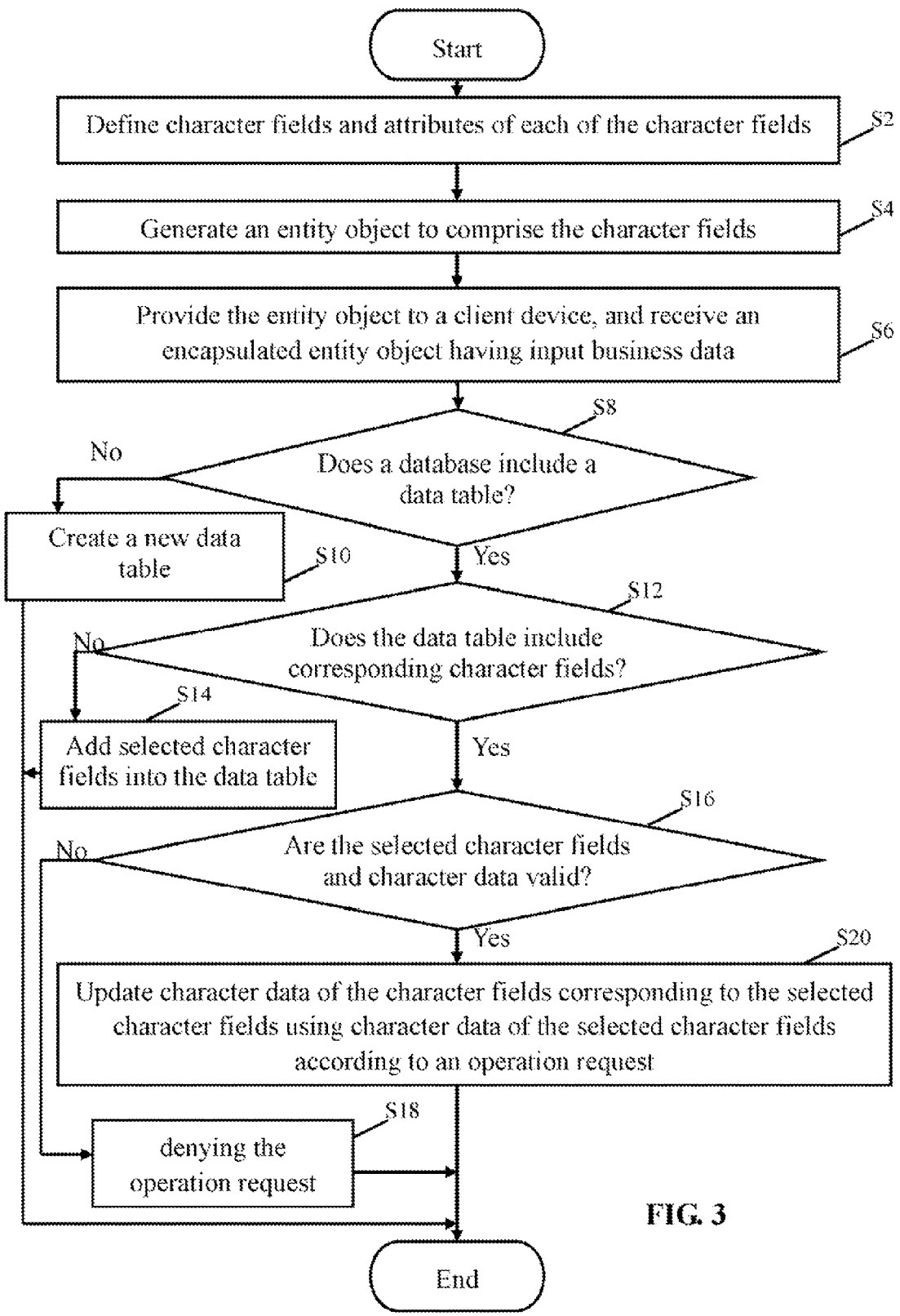
FIG. 3 is a flowchart of one embodiment of a database accessing method using the database accessing system.

FIG. 3 is a flowchart of one embodiment of a database accessing method using the database accessing system 10. Depending on the embodiment, additional steps can be added, others removed, and the ordering of the steps can be changed.

The definition module 100 defines a plurality of character fields and defines attributes of each of the character fields (block S2). The attributes of each of the character fields can include, but are not limited to, a field name, a data type, a length, default value(s), and a parameter that represents whether the character field is a primary key. The data type can be Boolean, string, numeral, or date/time, for example. The field name and the default value(s) can be predetermined, or modified according to user input.

In block S4, the creation module 102 generates an entity object to include the character fields. In some embodiments, the entity object can include all of the character fields predefined in block S2, or include some of the character fields predefined in block S2.

In block S6, the creation module 102 provides the entity object to a client device that is connected to the electronic device 1, and receives an encapsulated entity object having business data from the client device. In some embodiments, the entity object is provided to the client for a user to input business data, and the encapsulated entity object is created after the input business data is encapsulated in the entity object. The business data can include, but is not limited to, selected character fields, character data of the selected character fields, and an operation request for the database 120.

In some embodiments, the entity object can be provided to the client device using a plug-in program through a network (such as the Internet, an intranet, or a communication network) or a data connection (such as an Open Database Connectivity (ODBC)). The user can acquire the entity object through the client device, and input the business data in the entity object, and then the encapsulated entity object is created and transmitted to the electronic device 1.

In other embodiments, the database accessing system can provide a graphical user interface for the client device, the user can receive and view the entity object through the graphical user interface, and input relevant data, such as the business data.

In detail, after receiving the entity object from the electronic device 1, the user selects one operation on the database 120 from a plurality of predetermined operations provided by the entity object. For example, the predetermined operations can include, but are not limited to, an inquiry operation, a creation operation, an insertion operation, an updating operation, and a deletion operation. Then the operation request for the database 120 is generated according to the selected operation, such as an insertion request, an updating request, or a deletion request, for example. In other embodiments, the operation on the database 120 also can be inputted by the user. Furthermore, the user can select one or more character fields from all of the character fields in the entity object, and input corresponding character data of the selected character fields, to finish inputting the business data.

For example, when the user wants to insert character data "A" into a character field "BC", the selected operation is an insertion operation, the selected character field is "BC", and the character data of the selected character field is "A."

After the business data is finished inputting, the creation module 102 encapsulates the business data into the entity object.

In block S8, the parsing module 104 parses the encapsulated entity object to acquire the input business data, and the determination module 106 determines whether the database includes a data table. The parsing module 104 determines the selected character fields, the character data of the selected character fields, and the operation request for the database according to the input business data.

When the database does not include any data table, block S10 is implemented. When the database includes a data table, block S12 is implemented.

Figure 4:
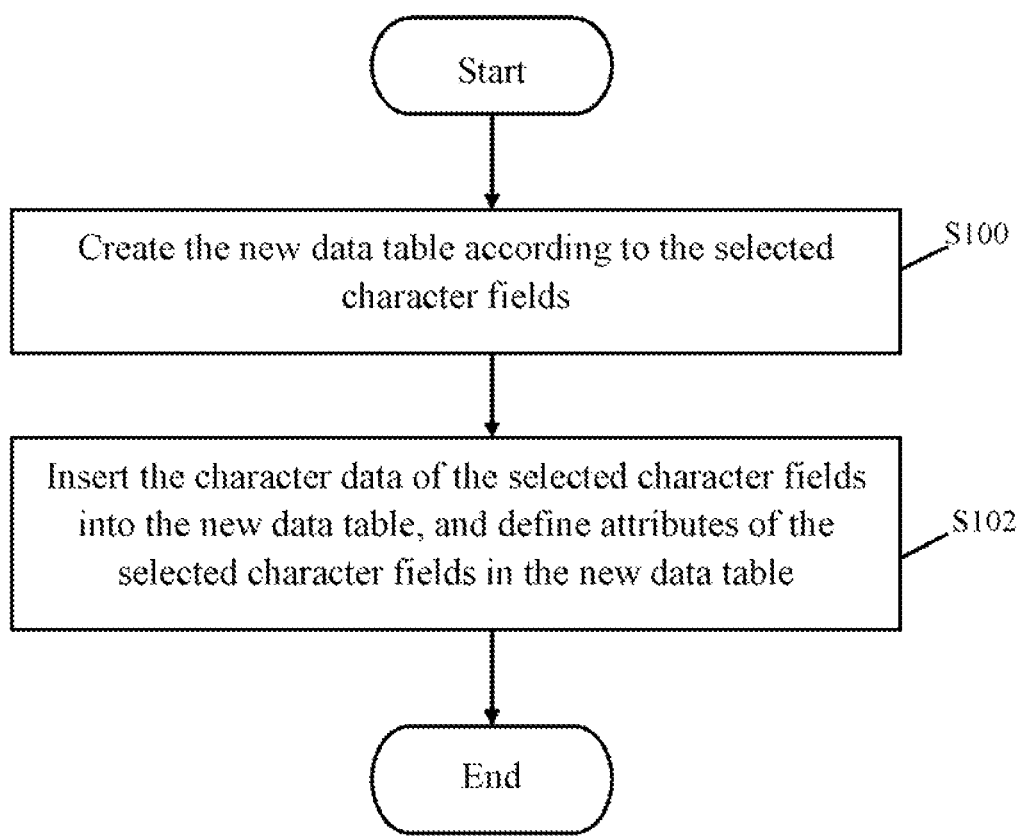
FIG. 4 is a flowchart of block S10 in FIG. 3.

In block S10, the accessing module 108 creates a new data table according to the selected character fields, then the procedure ends. FIG. 4 illustrates a detailed procedure of the creation of a new data table, and further details will be described below.

In block S12, the determination module 106 determines whether the data table includes character fields corresponding to the selected character fields. In other words, the determination module 106 determines whether the selected character fields are included in the data table. When the data table does not include the character fields corresponding to the selected character fields, block S14 is implemented. When the data table includes the character fields corresponding to the selected character fields, block S16 is implemented.

In block S14, the accessing module 108 adds the selected character fields into the data table in the database 120, inserts the character data of the selected character fields into the data table, and defines attributes of the selected character fields in the data table. The attributes of the selected character fields can be defined according to the attributes predefined in block S2.

In block S16, the determination module 106 verifies whether the selected character fields and the character data of the selected character fields are valid. When the selected character fields and the character data of the selected character fields are determined to be invalid, block S18 is implemented. When the selected character fields and the character data of the selected character fields are determined to be valid, block S20 is implemented.

In a first embodiment, the determination module 106 determines whether the attributes of the selected character fields are the same as attributes of the character fields in the data table which correspond to the selected character fields. For example, when a data type of one of the selected character fields is a string data type, the determination module 106 determines whether a data type of a character field in the data table corresponding to the one of the selected character fields is a string data type, to verify whether the selected character field is valid. For another example, the determination module 106 further verifies the selected character fields by comparing a length of one of the selected character field with a length of a corresponding character field in the data table.

In a second embodiment, the determination module 106 determines whether the character data of the selected character fields match the attributes of the character fields in the data table which correspond to the selected character fields. For example, when character data of a selected character field is numeral (e.g., 555), and a data type of a corresponding character field is also a numeral data type and a length of the corresponding character field is five, the determination module 106 determines that the character data of the selected character field is valid. When the data type of the corresponding character field is determined to be date/time, the determination module 106 determines that the character data of the selected character field is invalid.

In block S18, the accessing module 108 denies the operation request.

In block S20, the accessing module 108 updates character data of the character fields in the data table, which correspond to the selected character fields, using the character data of the selected character fields according to the operation request.

As mentioned above, the operation request can be an insertion request, an updating request, or a deletion request. When the operation request is the insertion request, the accessing module 108 inserts the character data of the selected character fields into the character fields in the data table corresponding to the selected character fields. When the operation request is the updating request, the accessing module 108 replaces original character data of the character fields in the data table corresponding to the selected character fields using the character data of the selected character fields. When the operation request is the deletion request, the accessing module 108 deletes the character fields in the data table corresponding to the selected character fields.

In other embodiments, when an inquiry request for the database 120 is received from the client device, the definition module 100 creates character fields corresponding to all character fields in the data table in the database 120, and defines attributes of the created character fields according to corresponding attributes of all character fields in the data table. The definition module 100 further acquires character data of all character fields in the data table, and generates a data set according to the acquired character data.

The creation module 102 generates a specified entity object according to the created character fields and the defined attributes of the created character fields, and binds the data set to the specified entity object. The accessing module 108 sends the specified entity object with the data set to the client device.

In other embodiments, the specified entity object can be pre-generated and stored in storage device 12 before the inquiry request for the database 120 is received from the client device, and the accessing module 108 sends the specified entity object when the inquiry request is received.

FIG. 4 is a flowchart of block S10 in FIG. 3. Depending on the embodiment, additional steps can be added, others removed, and the ordering of the steps can be changed.

In block S100, the accessing module 108 creates the new data table according to the selected character fields and corresponding character data in the business data, and inserts the character data of the selected character fields into the new data table.

In block S100, the accessing module 108 defines attributes of the selected character fields in the new data table, according to the attributes predefined in block S2 of FIG. 3.

It should be emphasized that the above-described embodiments of the present disclosure, particularly, any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computer-implemented database accessing method using an electronic device, the electronic device comprising a database and being connected to a client device, the method comprising:
    defining character fields and defining attributes of each of the character fields;
    generating an entity object to comprise the character fields;
    providing the entity object to the client device for a user to input business data, and receiving an encapsulated entity object encapsulating the input business data from the client device, the business data comprising selected character fields, character data of the selected character fields, and an operation request for the database;
    parsing the encapsulated entity object to acquire the input business data;
    when the database comprises a data table, determining whether the data table comprises character fields corresponding to the selected character fields:
    verifying whether the selected character fields and the character data of the selected character fields are valid when the data table comprises the character fields corresponding to the selected character fields; and
    updating character data of the character fields corresponding to the selected character fields using the character data of the selected character fields according to the operation request, when the selected character fields and the character data of the selected character fields are valid, or denying the operation request, when the selected character fields and the character data of the selected character fields are invalid.

2. The method according to claim 1, further comprising:
    creating a new data table according to the selected character fields when the database does not comprise a data table;
    inserting the character data of the selected character fields into the new data table; and
    defining attributes of the selected character fields in the new data table.

3. The method according to claim 1, further comprising:
    adding the selected character fields into the data table in the database, when the data table does not comprise the character fields corresponding to the selected character fields;
    inserting the character data of the selected character fields into the data table; and
    defining attributes of the selected character fields in the data table.

4. The method according to claim 1, wherein the step of updating character data of the character fields corresponding to the selected character fields using the character data of the selected character fields according to the operation request comprises:
    inserting the character data of the selected character fields into the character fields in the data table corresponding to the selected character fields, when the operation request is an insertion request;
    replacing original character data of the character fields in the data table corresponding to the selected character fields using the character data of the selected character fields, when the operation request is an updating request; or
    deleting the character fields in the data table corresponding to the selected character fields, when the operation request is a deletion request.

5. The method according to claim 1, further comprising:
    creating character fields corresponding to all character fields in the data table in the database, and defining attributes of the created character fields according to corresponding attributes of all character fields in the data table;
    generating a specified entity object according to the created character fields and the defined attributes;
    acquiring character data of all character fields in the data table, and generating a data set according to the acquired character data; and
    binding the data set to the specified entity object.

6. The method according to claim 5, further comprising:
    sending the specified entity object with the data set to the client device, when an inquiry request for the database is received from the client device.

7. The method according to claim 1, wherein the selected character fields and the character data of the selected character fields are verified by:
    determining whether attributes of the selected character fields are the same as attributes of the character fields in the data table which correspond to the selected character fields; or
    determining whether the character data of the selected character fields match the attributes of the character fields in the data table which correspond to the selected character fields.

8. An electronic device in connection to a client device, the electronic device comprising:
    at least one processor; and
    a plurality of storage devices having a database, and storing a plurality of instructions, which when executed by the processor, causes the at least one processor to:
    define character fields and define attributes of each of the character fields;
    generate an entity object to comprise the character fields;
    provide the entity object to the client device for a user to input business data, and receive an encapsulated entity object encapsulating the input business data from the client device, the business data comprising selected character fields, character data of the selected character fields, and an operation request for the database;
    parse the encapsulated entity object to acquire the input business data;
    when the database comprises a data table, determine whether the data table comprises character fields corresponding to the selected character fields:

verify whether the selected character fields and the character data of the selected character fields are valid when the data table comprises the character fields corresponding to the selected character fields; and update character data of the character fields corresponding to the selected character fields using the character data of the selected character fields according to the operation request, when the selected character fields and the character data of the selected character fields are valid, or deny the operation request, when the selected character fields and the character data of the selected character fields are invalid.

9. The electronic device according to claim 8, wherein the at least one processor further:

creates a new data table according to the selected character fields when the database does not comprise a data table;

inserts the character data of the selected character fields into the new data table; and defines attributes of the selected character fields in the new data table.

10. The electronic device according to claim 8, wherein the at least one processor further:

creates a new data table according to the selected character fields when the database does not comprise a data table;

inserts the character data of the selected character fields into the new data table; and defines attributes of the selected character fields in the new data table.

11. The electronic device according to claim 8, wherein the step of updating character data of the character fields corresponding to the selected character fields using the character data of the selected character fields according to the operation request comprises:

inserting the character data of the selected character fields into the character fields in the data table corresponding to the selected character fields, when the operation request is an insertion request;

replacing original character data of the character fields in the data table corresponding to the selected character fields using the character data of the selected character fields, when the operation request is an updating request; or deleting the character fields in the data table corresponding to the selected character fields, when the operation request is a deletion request.

12. The electronic device according to claim 8, wherein the at least one processor further:

creates character fields corresponding to all character fields in the data table in the database, and defines attributes of the created character fields according to corresponding attributes of all character fields in the data table;

generates a specified entity object according to the created character fields and the defined attributes;

acquires character data of all character fields in the data table, and generates a data set according to the acquired character data; and binds the data set to the specified entity object.

13. The electronic device according to claim 12, wherein the at least one processor further:

sends the specified entity object with the data set to the client device, when an inquiry request for the database is received from the client device.

14. The electronic device according to claim 8, wherein selected character fields and the character data of the selected character fields are verified by:

determining whether attributes of the selected character fields are the same as attributes of the character fields in the data table which correspond to the selected character fields; or determining whether the character data of the selected character fields match the attributes of the character fields in the data table which correspond to the selected character fields.

15. A non-transitory storage medium having stored thereon instructions that, when executed by a processor of an electronic device, causes the electronic device to perform a database accessing method, the electronic device comprising a database and being connected to a client device, the method comprising:

defining character fields and defining attributes of each of the character fields;

generating an entity object to comprise the character fields;

providing the entity object to the client device for a user to input business data, and receiving an encapsulated entity object encapsulating the input business data from the client device, the business data comprising selected character fields, character data of the selected character fields, and an operation request for the database;

parsing the encapsulated entity object to acquire the input business data;

when the database comprises a data table, determining whether the data table comprises character fields corresponding to the selected character fields:

verifying whether the selected character fields and the character data of the selected character fields are valid when the data table comprises the character fields corresponding to the selected character fields; and updating character data of the character fields corresponding to the selected character fields using the character data of the selected character fields according to the operation request, when the selected character fields and the character data of the selected character fields are valid, or denying the operation request, when the selected character fields and the character data of the selected character fields are invalid.

16. The non-transitory storage medium according to claim 15, wherein the method further comprises:

creating a new data table according to the selected character fields when the database does not comprise a data table;

inserting the character data of the selected character fields into the new data table; and defining attributes of the selected character fields in the new data table.

17. The non-transitory storage medium according to claim 15, wherein the method further comprises:

adding the selected character fields into the data table in the database, when the data table does not comprise the character fields corresponding to the selected character fields;

inserting the character data of the selected character fields into the data table; and defining attributes of the selected character fields in the data table.

18. The non-transitory storage medium according to claim 15, wherein the step of updating character data of the character fields corresponding to the selected character fields using the character data of the selected character fields according to the operation request comprises:

inserting the character data of the selected character fields into the character fields in the data table corresponding to the selected character fields, when the operation request is an insertion request;

replacing original character data of the character fields in the data table corresponding to the selected character fields using the character data of the selected character fields, when the operation request is an updating request; or deleting the character fields in the data table corresponding to the selected character fields, when the operation request is a deletion request.

19. The non-transitory storage medium according to claim 15, wherein the method further comprises:

creating character fields corresponding to all character fields in the data table in the database, and defining attributes of the created character fields according to corresponding attributes of all character fields in the data table;

generating a specified entity object according to the created character fields and the defined attributes;

acquiring character data of all character fields in the data table, and generating a data set according to the acquired character data; and binding the data set to the specified entity object.

20. The non-transitory storage medium according to claim 15, wherein the selected character fields and the character data of the selected character fields are verified by:

determining whether attributes of the selected character fields are the same as attributes of the character fields in the data table which correspond to the selected character fields; or determining whether the character data of the selected character fields match the attributes of the character fields in the data table which correspond to the selected character fields.

\* \* \* \* \*